Figure 1:
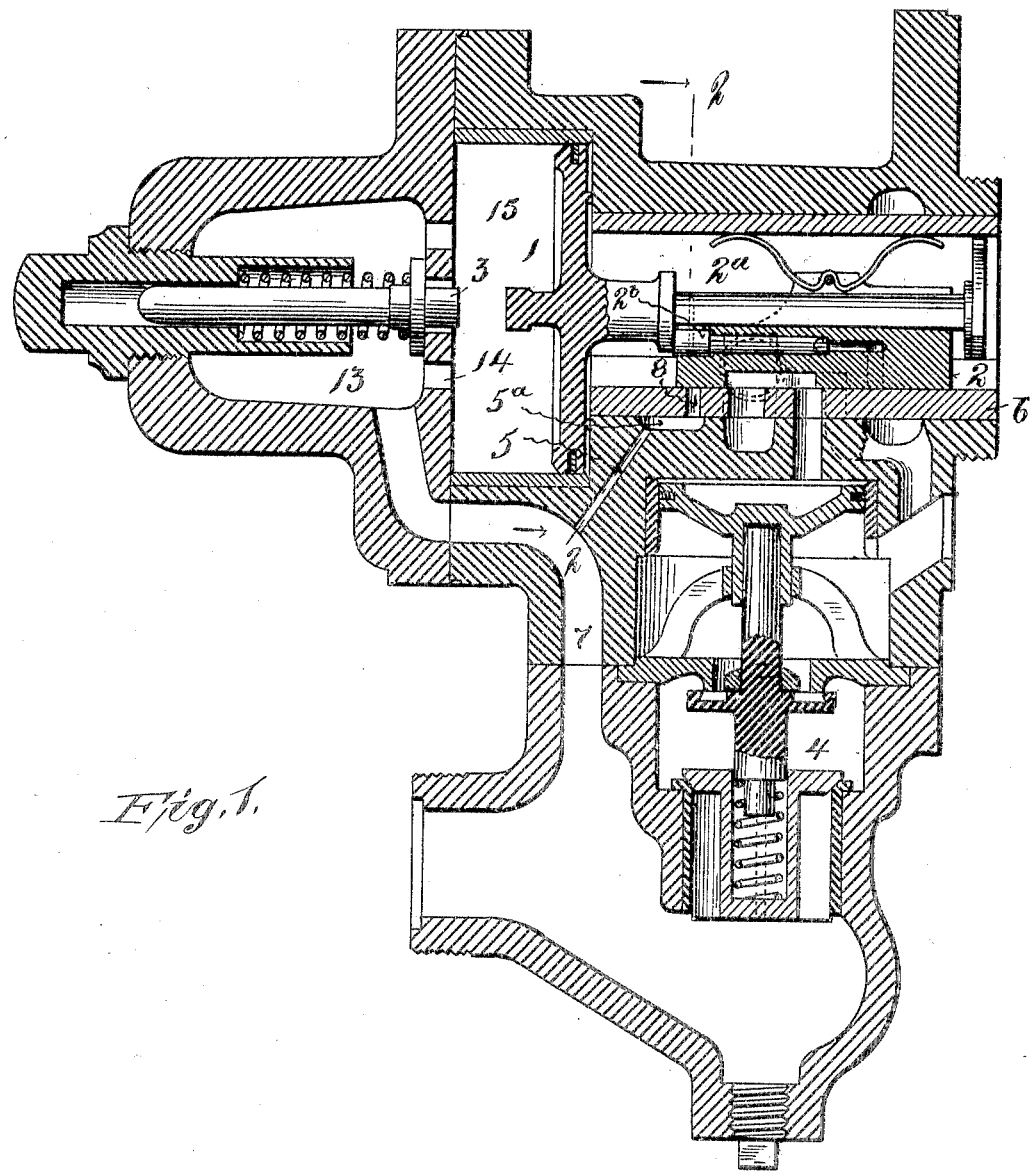

No. 793,979. PATENTED JULY 4, 1905.
J. H. BLEOO.
TRIPLE VALVE FOR AIR BRAKE SYSTEMS.
APPLICATION FILED JUNE 11, 1904.

2 SHEETS—SHEET 1.

Witnesses
C. W. Benjamin
M. Hollingshead

Inventor
John H. Bleoo.
By his Attorney
T. F. Bourne

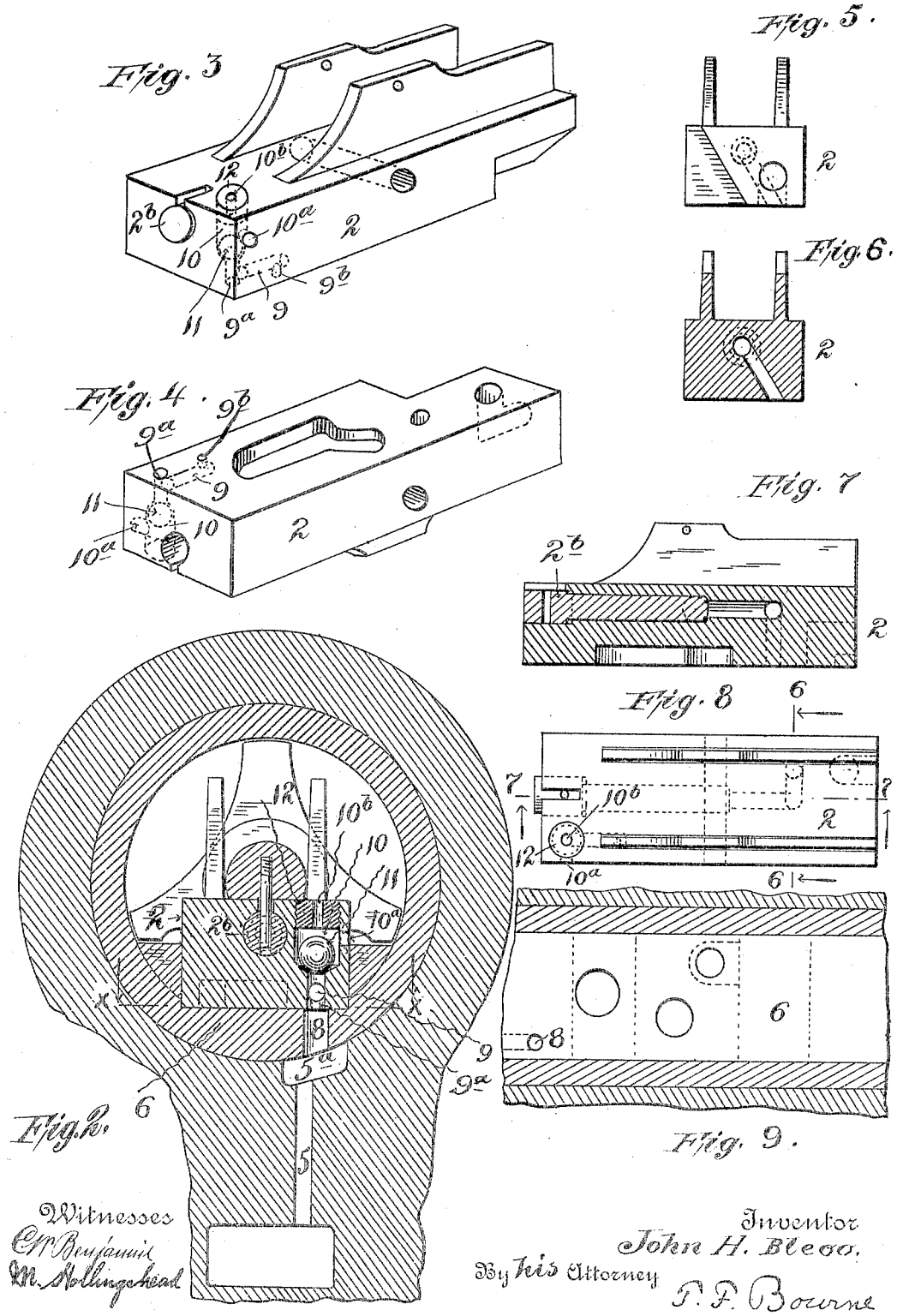

No. 793,979. Patented July 4, 1905.

UNITED STATES PATENT OFFICE.

JOHN H. BLEOO, OF NEW YORK, N. Y., ASSIGNOR TO ABRAHAM B. LEVY, OF NEW YORK, N. Y.

TRIPLE VALVE FOR AIR-BRAKE SYSTEMS.

SPECIFICATION forming part of Letters Patent No. 793,979, dated July 4, 1905.

Application filed June 11, 1904. Serial No. 212,059.

*To all whom it may concern:*

Be it known that I, JOHN H. BLEOO, a citizen of the United States, residing in New York city, borough of Brooklyn, New York, have invented certain new and useful Improvements in Triple Valves for Air-Brake Systems, of which the following is a specification.

This invention relates to improvements in triple valves, and has for its object to provide means for causing recharging of auxiliary reservoirs in air-brake systems during the time that the triple valve is in full-release position, and also while in lap position, and the brakes are applied or set, all whereby a rapid recharging of the auxiliary reservoirs may be made in order to maintain substantially the predetermined pressure in the auxiliary reservoirs and have full braking power for any service without impairing the desired action of the brakes in any way.

In carrying out my invention I provide the triple valve with a passage and port controlled by the travel of the slide-valve of the triple valve to communicate with the triple-valve chamber and which is in communication with train-line air, whereby when the triple valve is in full-release or lap positions recharging of the auxiliary reservoir will be accomplished.

The invention also comprises the novel details of improvement that will be more fully hereinafter set forth and then pointed out in the claims.

Reference is to be had to the accompanying drawings forming part hereof, wherein—

Figure 1 is a central section of a triple valve provided with my improvements. Fig. 2 is a cross-section thereof, enlarged, on the plane of the line 2 2 in Fig. 1. Fig. 3 is a perspective view of the triple-valve slide-valve embodying my improvements. Fig. 4 is an inverted perspective view thereof. Fig. 5 is an end view of the slide-valve looking from the right in Fig. 3. Fig. 6 is a cross-section on the line 6 6 in Fig. 8. Fig. 7 is a longitudinal section on the line 7 7 in Fig. 8. Fig. 8 is a plan view of the slide-valve, showing my improvements; and Fig. 9 is a horizontal section on the line $x$ $x$ in Fig. 2, showing the slide-valve seat on a reduced scale.

Similar numerals of reference indicate corresponding parts in the several views.

In the accompanying drawings I have shown my improvements as embodied in a triple valve of well-known make, such, for instance, as the Westinghouse triple valve.

As shown in the drawings, the piston 1, slide-valve 2, chamber $2^a$, spring-pressed graduating-pin 3, and emergency-valve 4 are all well known and operate in the usual manner, and such parts or their equivalents may be used in connection with my invention. In carrying out my invention, however, I provide in the material of the casing a passage and cavity 5 $5^a$, which may be cored out at the under side of the slide-valve seat 6, which communicate with the train-pipe air-passage 7 and with a port 8 in seat 6 distinct from the other usual ports. Said passage, cavity, and port are relatively large, affording free circulation of air from and drainage into the large passage 7. In the slide-valve 2 I provide an elongated passage 9, having two openings $9^a$ $9^b$ leading to the lower surface of the valve, which passage connects with or forms part of a cavity or chamber 10 in valve 2. Within said cavity is a ball 11, adapted to move freely in the cavity or chamber 10. Cavity 10 has an outlet $10^a$ leading through the side of the slide-valve 2 above the center of ball 11 into chamber $2^a$, and said cavity is also provided with an outlet $10^b$, shown in a screw-plug 12, fitted in the top of the cavity 10 and opening into chamber $2^a$. The other ports and passages of valve 2, seat 6, and the casing are well known and operate in usual manner.

The triple valve and its parts are shown in full-release position, (the brakes being released,) and while in this position the recharging of the auxiliary reservoir connected with chamber $2^a$ takes place as follows: Air from the train-pipe enters passage 7 in the usual manner and passes thence to chamber 13, through ports 14, to piston-chamber 15, retaining piston 1 in the position shown, while at the same time train-pipe air passes from passage 7 through 5, 5ª, and 8 and thence through opening 9ª in valve 2 around ball 11 into cavity 10, from whence it passes through outlets 10ª and 10ᵇ into slide-valve chamber 2ª, and thence to the auxiliary reservoir connected therewith. As ball-valve 11 does not close the outlets from cavity 10 into chamber 2ª, the full flow of train-pipe air is admitted to the valve-chamber 2ª, and thence to the auxiliary reservoir, while at the same time the full train-pipe pressure is maintained on the front or left-hand side of piston 1, it being understood that piston 1 makes its full travel to the right in Fig. 1 before the opening 9ª in slide-valve 2 alines with the port 8 in valve-seat 6.

In the service application the operation is as follows: The customary reduction of pressure from the train-pipe permits the auxiliary air in chamber 2ª to force piston 1 to the left in Fig. 1 very quickly, as all outlets from chamber 2ª are closed, the ball 11 closing the outlet from cavity 10 through passage 9ª, thus preventing reduction of auxiliary pressure occurring at the time of reduction of train-pipe pressure, and allowing full pressure of auxiliary air to act upon the piston. During such travel of the piston the slide-valve 2, graduating-valve 2ᵇ, and the other well-known parts operate in well-known manner, and when the piston is checked in its movement by the pin 3 (the recharging-port 8 being kept closed by valve 2 during the movement of the piston) and the slide-valve comes to rest, its opening 9ᵇ will register with port 8 in the slide-valve seat. At this time no air will pass to or from cavity 10, ball 11 closing passage 9ª just so long as the reduction of air-pressure from the train-pipe continues. When, however, the operator has set the brakes as much as desired and cuts off the further discharge of train-pipe air from passage 7 (piston 1 next moving to the right, in usual manner, and closing the graduating-valve 2ᵇ without moving the slide-valve) the brakes are being held set or applied, and thereupon train-pipe air, when in excess of auxiliary air-pressure, will flow freely from passage 5 5ª 8 past the ball 11 into cavity 10, through outlets 10ª and 10ᵇ, into chamber 2ª to the auxiliary reservoir, recharging the same and holding the brakes set indefinitely. By means of my improvements, also, the braking force can be continually increased, while the brakes are held set, by a slight reduction of train-pipe air-pressure, which will cause the piston 1 to move slightly to the left, opening the graduating-valve and allowing the accumulated pressure in the auxiliary reservoir to pass to the brake-cylinder, increasing the braking force, and then when the reduction of air from the train-pipe is stopped the piston will again move to the right sufficiently to close the graduating-valve and to again allow the train-pipe air to pass through cavity 10 into chamber 2ª to resupply the auxiliary reservoir, and so on. When an emergency application is made, the slide-valve 2 will be carried so far to the left in Fig. 1 that opening 9ᵇ will be carried beyond port 8, but so soon as such emergency reduction of train-pipe air is stopped by the operator the piston 1 will again move to the right until relieved of the extra pressure of the graduating-pin 3, and thereupon opening 9ᵇ will register with port 8, and recharging of chamber 2ª and the auxiliary reservoir will proceed as before explained, the brakes being held applied. It will thus be understood that by means of my improvements the auxiliary reservoir can be recharged at any time in the positions of full release and on service application and also after emergency application, and I gain the advantage of a rapid release when the brakes are released and a good recharge while the brakes are applied. By making the opening 9ᵇ relatively smaller than the opening 9ª, the ratio of recharging the auxiliary reservoirs while the brakes are applied or set, as in the service or lap position, may be regulated by about one-half that of recharging in the full-release position.

While I have shown my improvements applied to the Westinghouse type of triple valve, well known in the art, it will be understood that my invention is not limited for use with this particular type of valve, as it may be applied in similar relations to other styles of triple valves, wherein one of the valves of the triple valve, as the one that controls the flow of air from the auxiliary reservoir to the brakes, controls the flow of air from the train-pipe to the auxiliary reservoir while the valve is in the full-release and service positions, and it will also be understood that my invention is not limited to the particular details shown and described, as they may be varied without departing from the spirit thereof.

Having now described my invention, what I claim is—

1. A triple valve provided with a recharging-port opening into the slide-valve chamber and in communication with train-pipe air providing free access to said port for such air at all times, and means in the main slide-valve chamber for controlling the flow of air through said recharging-port while the slide-valve is in the service and full-release positions, substantially as described.

2. A triple valve provided with a recharging-passage connecting the slide-valve chamber with train-pipe air, said passage opening through the slide-valve seat, a slide-valve adapted to control such passage and provided with an opening to permit the flow of train-pipe air through said passage into said chamber while the slide-valve is in the service position, and provided with means operated by auxiliary air to prevent reduction of auxiliary air-pressure through said passage while the slide-valve is in service position without reduction of train-pipe pressure, substantially as described.

3. A triple valve provided with a recharging-passage connecting the slide-valve chamber with train-pipe air, said passage opening through the slide-valve seat, a slide-valve provided with means for admitting air to the slide-valve chamber while in full-release and service positions and having means to prevent reduction of auxiliary air-pressure through said recharging-passage, substantially as described.

4. A triple valve provided with a recharging-passage connecting the slide-valve chamber with train-pipe air, said passage opening through the slide-valve seat, a slide-valve provided with an elongated passage having two openings through the bottom of the valve for communication with the recharging-passage, said elongated passage being provided with an opening leading into said chamber whereby recharging may take place during full-release and service positions of the slide-valve, and means to prevent return flow of auxiliary air through the recharging-passage, substantially as described.

5. A triple valve provided with a recharging-passage connecting the slide-valve chamber with train-pipe air, said passage opening through the slide-valve seat, a slide-valve having a cavity communicating with an elongated passage having two openings leading through the wall of the slide-valve and also having an opening leading from said cavity to the slide-valve chamber all unobstructed to the free flow of recharging-air, substantially as described.

6. A triple valve provided with a recharging-passage connecting the slide-valve chamber with train-pipe air, said passage opening through the slide-valve seat, a slide-valve having a cavity communicating with an elongated passage having two openings leading through the wall of the slide-valve and also having an opening leading from said cavity to the slide-valve chamber all unobstructed to the free flow of recharging-air, and means to prevent the flow of auxiliary air through said passage, substantially as described.

7. A triple valve provided with a recharging-passage connecting the slide-valve chamber with train-pipe air, said passage opening through the slide-valve seat, a slide-valve provided with an elongated passage having two openings leading to the surface of the slide-valve for communication with the recharging-passage in full-release and service positions, and also having a cavity communicating with said elongated passage, said cavity being provided with an outlet at the side and an outlet at the top of the slide-valve, and a ball in said cavity to prevent the flow of auxiliary air through said recharging-passage, substantially as described.

JOHN H. BLEOO.

Witnesses:
H. B. BRADBURY,
T. F. BOURNE.